Dec. 22, 1936.  W. H. PEARCE  2,065,289
INSTRUMENT CASING
Filed Nov. 23, 1933
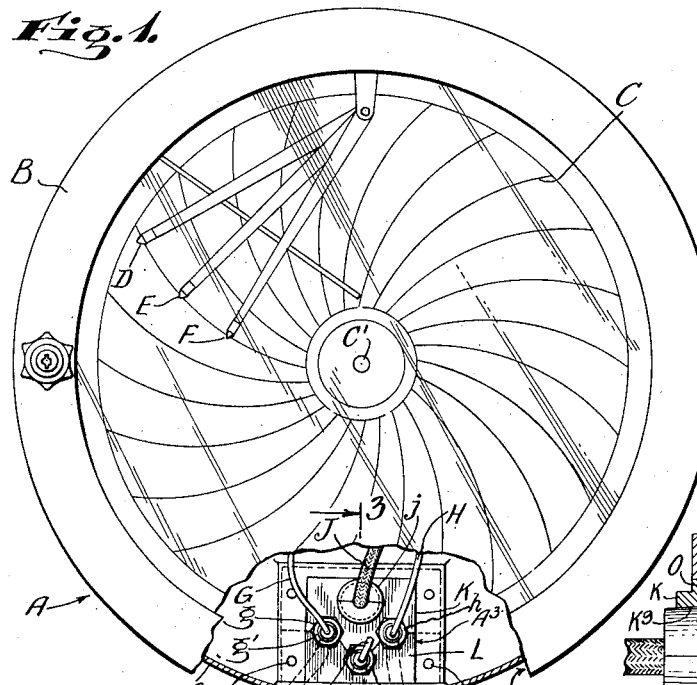
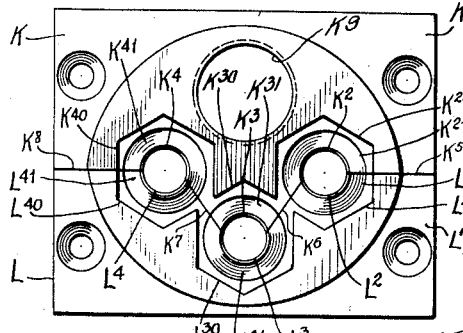
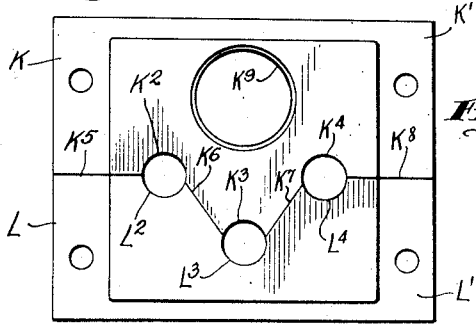
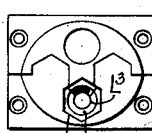
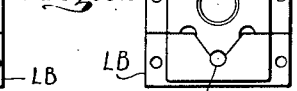
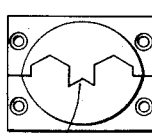
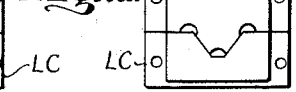
INVENTOR
WALTER H. PEARCE
BY John E. Hubbell
ATTORNEY Patented Dec. 22, 1936

2,065,289

UNITED STATES PATENT OFFICE 2,065,289

INSTRUMENT CASING

Walter H. Pearce, Philadelphia, Pa., assignor to The Brown Instrument Company, Philadelphia, Pa., a corporation of Pennsylvania Application November 23, 1933, Serial No. 699,370

9 Claims. (Cl. 73—151)

The present invention relates to instrument casings adapted to encase indicating, recording and control instruments and which may be employed for a wide range of purposes. For example, such instruments may be used as pressure gauges, as thermometers directly measuring thermometer bulb fluid pressure, as flow meters measuring pressure differences, and as meters employed for other purposes. In general any such instrument comprises an instrument casing, ordinarily including a door which may be opened when access to the meter mechanism within the casing is desirable, but which in normal use with the door closed, forms an enclosure for the meter mechanism not only protecting the latter against injurious mechanical contact, but also eliminating or minimizing the entrance of moisture, dust or other foreign matter into the enclosure. In numerous cases such instruments are used adjacent a furnace or other processing apparatus giving rise to fumes or vapors in the surrounding atmosphere which would corrode or otherwise injure the instrument mechanism if permitted to come into contact with the latter.

The modern tendency to standardization in manufacture has led to the use of a standard form of instrument casing to enclose instrument mechanisms of widely different types and uses, and the general object of the present invention is to facilitate and extend the use of a standard instrument casing form to instruments which have different requirements in respect to the extension through the instrument wall casing of connector parts. For example, in the case of a fluid flow meter, it is ordinarily necessary to transmit two fluid pressures through the instrument casing wall. In the case of a simple pressure gauge or bulb thermometer meter, only a single pressure connection need extend through the casing wall, but a single pressure gauge or thermometer instrument may be used to measure two or three different pressures or temperatures requiring a corresponding plurality of pressures to be transmitted through the casing wall. Moreover, the same standard form of instrument casing employed to house meter mechanisms requiring transmission of one or more fluid pressures through the casing wall may also be employed to house meter mechanisms which require the transmission of no fluid pressure through the casing wall.

More specifically stated, the object of the present invention is to provide a meter casing with an opening in its casing wall and with associated simple detachable interchangeable casing parts and connectors, all so formed that one or more or no transmitting connections, such as pressure tube sections may extend through said opening, as conditions of use make desirable. A more specific object of the invention is to provide a casing opening and detachable casing and connector parts so shaped and disposed that the connector parts may be extended optionally through one or the other of casing wall portions which extend in different directions, as conditions of use and particularly the manner in which the instrument casing is mounted on or connected to a supporting structure, may make desirable.

The invention in its preferred form is characterized by the provision of a series of detachable casing parts advantageously shaped to facilitate their production by simple die casting operations and shaped to permit interchangeable use of different combinations of the parts of said series to provide one or more than one or no connector receiving opening in the casing wall, as conditions of use make desirable.

The various features of novelty which characterize the invention are pointed out with particularity in the claims annexed to and forming a part of this specification. For a better understanding of the invention, however, its advantages and specific objects obtained with its use reference should be had to the accompanying drawing and descriptive matter which illustrates and describes a preferred embodiment of the invention.

Of the drawing:

Fig. 1 is a front elevation of an instrument partly broken away to show the interior construction;

Fig. 2 is a perspective view of a portion of the instrument casing shown in Fig. 1, but illustrating a modified arrangement of interchangeable casing parts;

Fig. 3 is a partial section on the line 3—3 of Fig. 1;

Fig. 4 is an outer side elevation, and Fig. 4A an inner side elevation of two interchangeable casing parts in the assembled relation shown in Fig. 1;

Figs. 5 and 5A are outer and inner elevations of two assembled interchangeable casing parts one of which is like one of the parts shown in Figs. 4 and 4A and the other of which differs from each of those parts;

Figs. 6 and 6A are outer and inner side elevations of two assembled interchangeable casing parts one of which is like the part shown in each of Figs. 4-5A and the other of which differs from any of the parts shown in the last mentioned figures.

Figs. 7 and 7A are outer and inner side elevations of two assembled interchangeable casing parts each of which differs from each of the parts shown in Figs. 4-6A;

In Fig. 1, I have illustrated an embodiment of my invention in a recording instrument comprising a casing A in the form of a cylindrical box having a closed rear wall $A^1$ integral with its peripheral wall $A^2$ and provided with a hinged covering or door B at its front side. The instrument is provided with a recording disc or chart C rotated by a shaft C' and comprises three pens, D, E and F turning about a common axis to thereby trace curve records on the chart of the varying values of pressures within pressure tubes G, H and I, respectively. Each of the tubes G, H and I may be connected externally of the casing to a thermometer bulb, a reservoir containing fluid under pressure, a conduit through which fluid is flowing or to any other source of fluid under pressure which it is desirable to indicate or record. Various forms of mechanisms through which variations of pressure in each of the tubes G, H and I may give oscillatory movements to the corresponding pen, D, E or F are well known. For example, each pen arm may be connected to the free end of a Bourdon tube coiled about a helix and having its other and stationary end connected to the corresponding pressure tube in the general manner illustrated in the Van Eyk and Pheiffer Patent No. 1,834,987, granted December 8, 1931, which shows two such Bourdon tube helices each giving motion to and directly connected to a corresponding pen. As the particular character of the pen actuating mechanism forms no part of the present invention, it is not illustrated herein. The record chart shaft C' may be rotated by an electric motor (not shown) within the instrument casing and energized by conductors within the cable J, in the manner in which the chart driving shafts of recording instruments are commonly rotated.

While the present invention is not concerned with the character of the mechanisms within the instrument casing associated with the pressure transmitting tubes G, H and I and the conductors within the cable J, the invention is concerned as has been stated, with the provisions made for passing said cable and said tubes, or extensions of the latter through the wall of the instrument casing. The novel provisions for the purpose in the form illustrated in Figs. 1-4A comprise casing parts K, L and M, which are desirably connected to the casing A and collectively close an opening in the latter. That opening comprises a rectangular notch portion $A^3$ in the rear casing wall $A^1$, and a rectangular notch $A^4$ in the curved peripheral wall $A^2$ of the casing. The two notches are similar in form and dimensions and merge into one another at the corresponding corner portion of the casing. Advantageously, as shown, an external recessed seat $A^5$ is formed in the back wall at the margin of the notch $A^3$ and a similar external seat $A^6$ is formed in the wall $A^2$ at the margin of the notch $A^4$, and preferably as shown, the casing wall is thickened at the margin of the notches to provide for the recessing and to provide ample casing metal thickness for the threaded openings receiving the screws N by which the casing parts K, L and M are detachably secured to the casing body.

The casing parts K and L are so shaped and the holes in them and in the casing body receiving the screws N are so disposed that the parts K and L may be secured against the seat $A^5$ and close the notch $A^3$ as shown in Fig. 1, or may be secured against the seat $A^6$ and close the notch $A^4$ as shown in Fig. 2. With the parts K and L arranged as shown in Fig. 1, the part M is secured against the seat $A^6$, and with the parts K and L arranged as in Fig. 2, the part M is secured against the seat $A^5$. The parts K, L and M are relatively shaped so that the part M may fit snugly against the part L in one, and against the part K in other of said arrangements. A gas or fume tight joint between the casing body and the parts K, L and M may be insured by the use of suitable gasket material O.

The part M may well be a flat piece of metal as shown but advantageously the parts K and L comprise platelike seat engaging flange portions $K^1$ and $L^1$, respectively, and body portions which are made thicker to better accommodate the notches, recesses and grooves now to be described and to give additional strength and rigidity. In particular the body portions of the members K and L may well be thickened as shown to substantially fill the notch $A^3$ or $A^4$ which they close in one or the other of their operative positions. The part K has formed in its edge adjacent the part L three curved notches $K^2$, $K^3$ and $K^4$ which unite with curved notches $L^2$, $L^3$ and $L^4$, respectively, in the adjacent edge of the member L, so that the notches $K^2$ and $L^2$ collectively form a circular opening, and so that the notches $K^3$ and $L^3$ and $K^4$ and $L^4$ form two similar circular openings. The notch $K^3$ is nearer the corner edge of the casing than the notches $K^2$ and $K^4$, which are at equal distances from said edge. To accommodate the described relative disposition of said openings, and to facilitate the interchangeable use with either of the parts K and L of other casing parts as hereinafter described, and to facilitate the die casting of all of said parts, the edge of the member K adjacent the member L, in the preferred construction illustrated, comprises a section $K^5$ extending diametrally from the opening formed by the notches $K^2$ and $L^2$ to the adjacent end edge of the part K and transverse to that edge, a section $K^6$ between and extending transversely of the openings formed by the notches $K^2$ and $L^2$, and $K^3$ and $L^3$, and a section $K^7$ extending transversely of and between the openings formed by the notches $K^3$ and $L^3$, and $K^4$ and $L^4$, and a section $K^8$ in alignment with the section $K^5$. The various edge sections $K^5$, $K^6$, $K^7$ and $K^8$ lie in planes transverse to the plane of the flange portion $K^1$. The edge of the member L adjacent the part K comprises sections which are counterparts in shape of and abut against the sections $K^5$, $K^6$, $K^7$ and $K^8$.

The opening formed by the notches $K^2$ and $L^2$ receives a casing wall penetrating connector conduit or bushing part $g$ which surrounds or forms an extension of the pipe G, and in any event connects the tube section G within the instrument casing to an external section G' of that tube. Similarly the opening formed by the notches $K^3$ and $L^3$ receives a connector or bushing part $i$ connecting the tube section I within the instrument casing to an external extension section I', and the opening formed by the notches $K^4$ and $L^4$ receives a connector or bushing part $h$ connecting the tube section H within the instrument casing to an external extension section H'. The sections G', H' and I' in many cases are flexible armored tubes as shown.

The connector part $i$ comprises a cylindrical body portion threaded at its inner end to receive a clamping nut P and formed at its outer end with an enlarged head $i'$, which as shown, is hexagonal and is formed at its inner end with a tapered rib extending circumferentially about the axis of the part. The parts K and L are formed at their outer sides with recesses $K^{30}$ and $L^{30}$ extending about the notches $K^3$ and $L^3$ and collectively forming a hexagonal socket receiving the head $i'$ of the connector $i$. At the bottom of the recess $K^{30}$, a tapered arc shaped groove $K^{31}$ is formed and a similar arc shaped groove $L^{31}$ is formed at the bottom of the recess $L^{30}$. The two arc shaped grooves $K^{31}$ and $L^{31}$ collectively form a circular tapered groove receiving the rib $i^2$. In consequence when the nut P is tightened up on the inner threaded end of the part $g$, the conical surfaces of the groove sections $K^{31}$ and $L^{31}$ and rib $i^2$ engage and coact so that the rib $i^2$ serves as a locking wedge to firmly hold the parts K and L together in their assembled positions.

In external contour, the parts $g$ and $h$ may be exactly like the part $i$, and are associated in the same manner with parts K and L, which have recess and groove portions $K^{20}$, $L^{20}$, $K^{21}$ and $L^{21}$ receiving the head and rib of the part $g$, and have recess and groove portions $K^{40}$, $L^{40}$, $K^{41}$ and $L^{41}$ receiving the head and rib of the part $h$, as the recess and groove portions $K^{30}$, $L^{30}$, $K^{31}$ and $L^{31}$ receive the head and rib of the part $i$. To permit a desirably close spacing of the parts $g$, $h$ and $i$, and to avoid undesirably thin metal web portions, the socket formed by the recesses $K^2$ and $L^2$ opens along a portion of one side into the socket formed by the recesses $K^3$ and $L^3$, and the latter similarly opens into the socket formed by the recesses $K^4$ and $L^4$.

For the passage through the casing wall of the cable J, the part K is formed with a tapered opening $K^9$ receiving a bushing $j$ which surrounds the cable and is preferably formed of insulating material such as bakelite. The bushing is advantageously split longitudinally, and formed with an internally knurled surface $j'$ providing projections which bite into the outer surface of the cable J and thereby anchor the latter in place when the bushing $j$ is snugly seated in the opening $K^9$.

The advantage of having the cable J and connector parts $g$, $h$ and $i$ extend either through the rear wall of the casing as shown in Fig. 1, or through the peripheral wall of the casing as shown in Fig. 2, as conditions make desirable, will be readily apparent to those skilled in the art. In general which of the two arrangements is employed in any particular installation will depend on the manner in which the instrument is mounted. As shown the instrument is formed with provisions of the character disclosed and claimed in the Harrison Patent No. 1,859,872, granted May 24, 1932 for panel mounting or for mounting in front of a supporting structure. With the panel mounting the body of the instrument casing extends through a correspondingly shaped opening in the panel and the front side of the latter is engaged at the margin of the panel opening by a peripheral flange $A^7$ extending radially outward from the front edge of the curved wall $A^2$. With the panel mounting, the bushing $j$ and connector parts $g$, $h$ and $i$ preferably extend through the back wall of the casing as shown in Fig. 1. When the instrument is mounted in front of a supporting structure, it may be secured to the latter by screws extending through radial parts Q projecting outward from the peripheral wall $A^2$ of the casing adjacent the rear side of the latter. In the type of instrument shown there may well be three parts Q arranged about the peripheral wall of the casing, one of those parts being shown in Fig. 2. Preferably as shown, the rear side of the part Q is flush with the rear side of the back wall $A^1$ of the casing, the part Q being secured by a screw $Q'$ in an external casing wall recess $A^8$ of sufficient radial depth to entirely receive the part Q when the latter is turned end to end in the recess in the panel mounting condition of the casing. When the casing is thus mounted in front of a supporting structure, the bushing $j$ and connector parts $g$, $h$ and $i$ ordinarily in use extend through the peripheral wall of the instrument casing as shown in Fig. 2.

An instrument casing of the character shown in Fig. 1 may be used to enclose instruments which because of their construction or mode of use require fewer pressure tube openings than are shown in Fig. 1, and in some cases no such opening is required. When two pressure tube openings in the casing are needed, we may make use of the part K in conjunction with a part LA as shown in Figs. 5 and 5A. The part LA differs from the part L only in that the recess $L^3$ of the part L is omitted in the part LA, and in that the latter is provided with a rib portion $L^{32}$ of cylinder segment shape which extends into and fills the recess $K^3$ of the part K when the parts K and LA are assembled as shown in Figs. 5 and 5A. While the recess and groove portions $K^{30}$, $L^{30}$, $K^{31}$ and $L^{31}$ are not in use in the arrangement shown in Figs. 5 and 5A, their presence is not objectionable, and there is thus no necessity for replacing the part K by another part differing therefrom only in the omission of the recess and groove portions $K^{30}$ and $K^{31}$. The presence of the recess and groove portions $L^{30}$ and $L^{31}$ of the part LA is explained by the fact that the parts L and LA are preferably formed in a die casting machine in which the die parts used to form the part LA are also used to form the part L, which is formed, in effect, from a part LA by a simple punching operation.

When only one pressure tube opening in the instrument casing is required, I employ the part K in conjunction with a part LB as shown in Figs. 6 and 6A. The part LB is formed with recess and notch portions $L^3$, $L^{30}$ and $L^{31}$ like those of the part L, but omits the notch, recess and groove portions $L^2$, $L^4$, $L^{20}$, $L^{40}$, $L^{21}$ and $L^{41}$. The part LB, moreover, is formed with extensions which enter and fill the recesses $K^{20}$ and $K^{40}$ when the parts K and LB are assembled as shown in Figs. 6 and 6A.

In some instruments which may be enclosed within the casing A the chart shaft may be rotated by a spring motor or mechanical clock within the casing, so that the cable J is not required. In such case, we may make use of a part KA differing from the part K only in the omission of the opening $K^9$ of the latter. As those skilled in the art will understand, the part K may be a die cast part formed from a part KA by punching the hole $K^9$ in the latter. The part KA may replace the part K in any of the arrangements shown in Figs. 4 to 6A.

When openings to accommodate none of the parts g, h, i and j are required, I combine the part KA with the part LC as shown in Figs. 7 and 7A. The part LC differs from the part LB in the omission of the notch, recess and groove portions $L^3$, $L^{30}$, and $L^{31}$ and in the addition to the metal replacing such notch, recess and groove of metal forming a rib portion $L^{35}$ which extends into the recess portion $K^3$ of the member KA. As will be readily apparent, the part LC may be combined with the part K when there is need for the opening $K^9$ and for no other openings through the portion.

As will be apparent, the combination of the two members K and L shown in Fig. 4, constitutes a closure assemblage which is interchangeably usable with the different assemblages each formed by a combination of two members or parts which are shown in Figs. 5, 6 and 7. Those assemblages are all alike in that one member, K or KA, of each assemblage is formed with a plurality of notches $K^2$, $K^3$ and $K^4$ in one edge, and in that the other member of the assemblage has its portion adjacent each of said notches specially shaped either to close, or to provide a connector aperture enlargement of the corresponding notch. Each combination or assemblage differs from each of the other combinations or assemblages, however, in the number of connector apertures collectively provided by the parts or members combined to form the assemblage. Furthermore, as will be readily apparent, if the members K and M were permanently connected to or formed integral portions of the instrument casing with those members in their positions referred to in Fig. 1 or in Fig. 2, the separate use in connection therewith of the closure members or parts L, LA and LB would give the different connector aperture arrangements shown in Figs. 4, 5 and 6. The construction illustrated, however, in which the parts K and M are separable from the casing body and may be connected to the latter in different ways has special practical advantages.

While in accordance with the provisions of the statutes I have illustrated and described the best form of my invention now known to me, those skilled in the art will understand that changes in the form of the apparatus disclosed may be made without departing from the spirit of the invention as set forth in the appended claims and that some features of the invention may sometimes be used to advantage without a corresponding use of other features.

Having now described my invention, what I claim as new and desire to secure by Letters Patent is:

1. The combination with an instrument casing having a wall opening extending through a portion of said casing providing a continuous marginal outline for said opening, apertured closure means for said opening, comprising complementary members, one member being provided with a base outline for inter-engagement with complementary members of different design but each having a portion configured for registration with said base outline, whereby the aperture pattern of the closure means may be varied by selection of a particular complementary member, and a complementary member cooperatively associated with said one member.

2. The combination with an instrument casing having a wall opening and an instrument connection part extending through said opening, of closure means for said opening comprising separable members which in their closing positions extend into said opening from different portions of the margin thereof and closely surround said part, the latter having provisions for clamping it to said members.

3. The combination with an instrument casing having a wall opening and a tubular connector part extending through said opening, of closure means for said opening comprising separable members which in their closing positions extend into said opening from different portions of the margin thereof and closely surround said part, said members and part having cooperating provisions including wedging surfaces on said members and cooperative wedging surface portions on said part for clamping said part and members together.

4. Apertured closure means adapted to form a closure assemblage for an instrument casing wall opening comprising complementary members, one member being provided with a base outline for inter-engagement with complementary members of different design but each having a portion configured for registration with said base outline, whereby the aperture pattern of the closure means may be varied by selection of a particular complementary member to provide a separate passage for one or for each of a plurality of instrument connections, and a complementary member cooperatively associated with said one member.

5. Apertured closure means adapted to form a closure assemblage for an instrument casing wall opening comprising complementary members, one member being provided with a base outline for inter-engagement with complementary members of different design, but having a portion configured for registration with said base outline, whereby the aperture pattern of the closure means may be varied by selection of a particular complementary member to provide a separate passage for one or for each of a plurality of instrument connections, and a complementary member cooperatively associated with said one member, each of the members so cooperatively associated having a connector engaging wedging surface adjacent and inclined to the axis of each such aperture which it may be employed to provide, and a separate instrument connection part mounted in each aperture in such assemblage and having a wedging surface for engaging the wedging surfaces of the two members of the assemblage adjacent the aperture in which such part is mounted.

6. In an instrument casing having a wall opening, apertured closure means for said opening comprising complementary members, one member being a casing wall part provided with a base outline, including a plurality of connection receiving notches in the marginal edge of said opening, for inter-engagement with complementary members of different design but each having a portion configured for registration with said base outline whereby the aperture pattern of said closure means may be varied by selection of a particular complementary member to vary the number of said notches available to receive instrument connections, and a complementary member cooperatively associated with said one member.

7. The combination with an instrument casing having a wall opening, of closure means for said opening, comprising complementary members, one member being provided with a base outline for inter-engagement with complementary members of different design but having a portion configured for registration with said base outline, whereby the aperture pattern of the closure means may be varied by selection of a particular complementary member to thereby provide one or more apertures for the passage of an instrument connection or to provide a complete closure for said wall opening, and a complementary member cooperatively associated with said one member.

8. The combination with an instrument casing having a wall opening for the passage of tubular instrument connections, of closure means comprising two members having abutting edge portions each of said edge portions being formed with one or more notches each adapted to register with a corresponding notch in the abutting edge portion of the other member and each being formed with a seat portion including a wedging surface adjacent each notch and a tubular connector part received in each registering pair of notches and having wedging surface portions cooperating with the first mentioned surfaces to hold said members together.

9. In an instrument casing having a wall opening, apertured closure means for said opening comprising complementary members, one member being a casing wall part provided with a base outline, including a plurality of connection receiving notches in the marginal edge of said opening, for inter-engagement with complementary members each having a portion configured for registration with said base outline and including parts respectively adapted to close or to provide an extension of the different notches, the last mentioned complementary members being of different design in respect to their said parts whereby the aperture pattern of said closure means may be varied by selection of a particular complementary member to vary the number of said notches extended and thereby made available to receive instrument connections, and a complementary member cooperatively associated with said one member.

WALTER H. PEARCE.